(12) United States Patent
Lee (10) Patent No.: US 9,224,555 B2
(45) Date of Patent: Dec. 29, 2015

(54) LIGHT EMITTING DIODE ILLUMINATED KEYBOARD

(71) Applicant: Hyung Tae Lee, Seoul (KR)

(72) Inventor: Hyung Tae Lee, Seoul (KR)

(73) Assignees: Wenyu Zhang, Beijing (CN); LEETIS TECHNOLOGY DEVELOPMENT (HK) COMPANY LIMITED, Kowloon (HK)

( * ) Notice: Subject to any disclaimer, the term of this patent is extended or adjusted under 35 U.S.C. 154(b) by 235 days.

(21) Appl. No.: 13/726,678

(22) Filed: Dec. 26, 2012

(65) Prior Publication Data

US 2013/0265740 A1    Oct. 10, 2013

(30) Foreign Application Priority Data

Apr. 6, 2012    (KR) .................. 10-2012-0035950

(51) Int. Cl.
| | |
|---|---|
| *H01H 13/83* | (2006.01) |
| *G06F 3/02* | (2006.01) |
| *G06F 3/0489* | (2013.01) |
| *G06F 3/023* | (2006.01) |

(52) U.S. Cl.
CPC ............... *H01H 13/83* (2013.01); *G06F 3/02* (2013.01); *G06F 3/0202* (2013.01); *G06F 3/0231* (2013.01); *G06F 3/0238* (2013.01); *G06F 3/04895* (2013.01); *H01H 2219/039* (2013.01)

(58) Field of Classification Search
CPC .................................. G06F 3/02; G06F 3/0202
USPC ............. 345/156, 168–172; 362/23.03, 23.07
See application file for complete search history.

(56) References Cited

U.S. PATENT DOCUMENTS

| | | | | |
|---|---|---|---|---|
| 6,320,519 | B1 * | 11/2001 | Hsu et al. ........................ 341/23 |
| 2004/0159779 | A1 * | 8/2004 | Duff ............................... 250/221 |
| 2005/0073446 | A1 * | 4/2005 | Lazaridis et al. ............... 341/22 |
| 2006/0117232 | A1 * | 6/2006 | Warren et al. ................. 714/724 |
| 2009/0224947 | A1 * | 9/2009 | Frazier ............................ 341/22 |
| 2010/0238120 | A1 * | 9/2010 | Hsieh ............................ 345/170 |

* cited by examiner

*Primary Examiner* — David Tung
(74) *Attorney, Agent, or Firm* — Anova Law Group, PLLC (57) ABSTRACT

The present invention provides an LED illuminated keyboard, which controls LED components with specific color hues to illuminate by pressing a specific key. The LED illuminated keyboard according to the present invention merely uses a micro control unit (MCU) commonly used in a keyboard of a computer, and connects switch circuits capable of controlling the LED components with the specific color hues to an output terminal of a GPIO of the MCU, to make a plurality of keys of the keyboard illuminate with multiple color hues. Therefore, the LED illuminated keyboard according to the present invention brings in advantages of low cost and easy use.

3 Claims, 5 Drawing Sheets

LIGHT EMITTING DIODE ILLUMINATED KEYBOARD

FIELD OF THE INVENTION

The present invention relates to a light emitting diode (LED) illuminated keyboard, and more particular, LED components are installed in multiple keys of a computer-used keyboard, and color hues of the multiple keys are different according to an operation condition of the computer. In other words, based on operation condition of software programs, the multiple keys are changed to related key modes automatically, and are categorized into a plurality of groups to illuminate with designated color hues respectively. Therefore, the operation convenience of the keyboard is improved, namely, the multi-hues LED illuminated keyboard is convenient for use.

DESCRIPTION OF RELATED ART

When a computer is used in a dark environment, keys of a keyboard cannot be identified accurately and thus an additional illuminating device is needed, or the keys need to be identified with assistance of light illuminated from a display device. This brings inconvenience for using the keyboard. Accordingly, techniques of installing backlight elements in the keys of the keyboard are proposed. The techniques can be referenced to following patent documents.

Patent documents: Korean patent publications No. 2000-0002926, No. 2004-0100115, No. 2005-002275, No. 2007-0006188, No. 2007-0054299, No. 2008-0112616, No. 2010-0043126, and No. 2011-0049058; Korean issued patent No. 0865896 and No. 0830522; Korean utility model publications No. 1998-018311, No. 2011-0006385, and No. 2011-0000722, etc.

However, in the above technique, LED components are simply used as the backlight of the keys, thus the multiple keys of the keyboard can only illuminate with a single color hue.

Accordingly, it is proposed that each key is configured with red (R), green (G), blue (B) three LED components respectively (red, green, blue are three-primary colors of light), and the keys of the keyboards are controlled to illuminate with different color hues by use of a control electrical signal. However, in the existing techniques, to realize the above-mentioned effect, in addition to a commonly used micro control unit (MCU), another micro control unit which is capable of controlling light illumination needs to be additionally configured in the keyboard; or, an micro control unit which includes an additional function of light illumination control needs to be re-designed to replace the commonly used micro control unit. In the case that the first technique is employed, the additional micro control unit which is capable of controlling light illumination brings in an increase of cost, and moreover, great effort should be made for integration of the entire system, this causes the cost to be further increased, and may also create the instability to the system. In case that the second techniques is employed, because it is required to re-design the micro control unit including an additional function of light illumination control on the basis of a normal function of the micro control unit, the cost also needs to be increased. Besides, in order to solve the above-mentioned problems, proposal has been raised on controlling color due of light emitted by each of the keys of the keyboard by implementing computer program, however, it cannot be achieved by use of an existing micro control unit that is commonly used in the keyboard, and consequently, the micro control unit still needs to adopt the above two structures. Patent documents mentioning the above contents including: Korean patent publications No. 2003-0079885 and No. 2009-0124630; Korean issued patent No. 0527264, No. 1007855 and No. 0998996, etc.

SUMMARY

In view of the above problem, the present invention provides an LED illuminated keyboard in which multiple keys of the keyboard illuminates with multiple color hues by just use of a micro control unit commonly used in a computer-used keyboard.

An LED illuminated keyboard, which illuminates with different color hues in accordance with different functions, includes a plurality of keys and a micro control unit for transmitting signals generated by the keys to a computer, LED components are respectively disposed beneath the plurality of keys to provide light for corresponding keys; the keys includes a first control signal generating key for generating a first control signal and a second control signal generating key for generating a second control signal; the LED components include a plurality of LED components with a first color hue, a plurality of LED components with a second color hue, and a plurality of LED components with at least one color hue selected from a third color hue, a fourth color hue and a fifth color hue; the LED components with the first color hue is categorized into a first group, a second group and a third group; the LED components with a second color hue are disposed in the keys in which the first group of the LED components with the first color hue are disposed, the LED components with at least one color hue selected from a third color hue, a fourth color hue and a fifth color hue that are disposed in the keys in which the second group of the LED components with the first color hue are disposed; the LED illuminated keyboard further include circuits for controlling illumination of the LED components according to output signals of a GPIO of the micro control unit, the switch circuits include a first switch circuit, a second switch circuit, a third switch circuit and a fourth switch circuit; the first switch circuit is configured to enable the LED components with the second color hue to illuminate when the first control signal generating key is in an ON state; the second switch circuit is configured to enable the first group of the LED components with the first color hue to illuminate when the first control signal generating key is in an OFF state; the third switch circuit is configured to enable the LED components with the at least one color hue selected from the third color hue, the fourth color hue and the fifth color hue to illuminate when the second control signal generating key is in an ON state; the fourth switch circuit is configured to enable the second group of the LED components with the first color hue to illuminate when the second control signal generating key is in an OFF state; the micro control unit is configured to enable the third group of the LED components with the first color hue to illuminate when the keys are pressed to transmit original values thereof to the computer.

As a further improvement of the LED illuminated keyboard, the micro control unit is constituted by a single IC chip.

As a further improvement of the LED illuminated keyboard, the first control signal generating key is a Caps Lock key, and the keys in which the LED components with the second color hue are disposed are the Caps Lock key and 26 alphabet keys.

As a further improvement of the LED illuminated keyboard, the second control signal generating key is a Fn key newly added in a normal keyboard, and the keys in which the LED components with the at least one color hue selected from the third color hue, the fourth color hue and the fifth color hue are disposed are the Fn key and function extending keys, the function extending keys are keys making the computer implement functions different from original functions of the keys being pressed when the Fn key is in an ON state.

As a further improvement of the LED illuminated keyboard, the function extending keys are selected from multi-media function keys, shortcut keys and function enhancing keys; the multi-media function keys are configured for executing functions of a multi-media program when the computer implements the multi-media program; the shortcut keys are configured for executing a specific procedure in a certain program when the computer implements the program and the function extending keys are pressed, and the function enhancing keys having other key values when the function key (Fn key) is in the ON state, even if the function enhancing keys have unique values when being combined with a Shift key, a Ctrl key or an Alt key.

As a further improvement of the LED illuminated keyboard, the LED illuminated keyboard is a Qwerty type wireless mini-keyboard, a power supply is provided to the LED components when the keyboard is connected to the computer, the provision of the power supply enables the LED components with the first color hue to implement an illumination initialization process.

As a further improvement of the LED illuminated keyboard, when the second control signal generating key is pressed upon the condition that the first control signal generating key is in the ON state, the second control signal generating key is switched to the ON state while the first control signal generating key is switched to the OFF state simultaneously; when the first control signal generating key is pressed upon the condition that the second control signal generating key is in the ON state, the first control signal generating key is switched to the ON state while the second control signal generating key is switched to the OFF state simultaneously.

Compared with the exiting techniques, the multi-hues LED illuminated keyboard according to the present invention can automatically perform switching between non-illumination and illumination on the LED components with different color hues simultaneously in accordance with functions, therefore, the keyboard is convenient for use. Moreover, it is unneeded to configure with an additional MCU, only a commonly used MCU in the keyboard is used to realize illumination of various kinds of light, therefore, the keyboard according to the present invention is with low cost and simple configuration.

DETAILED DESCRIPTION

Reference will now be made to the drawings to describe the LED illuminated keyboard which illuminates with different color hues in accordance with functions according to the present invention in detail.

Figure 1:
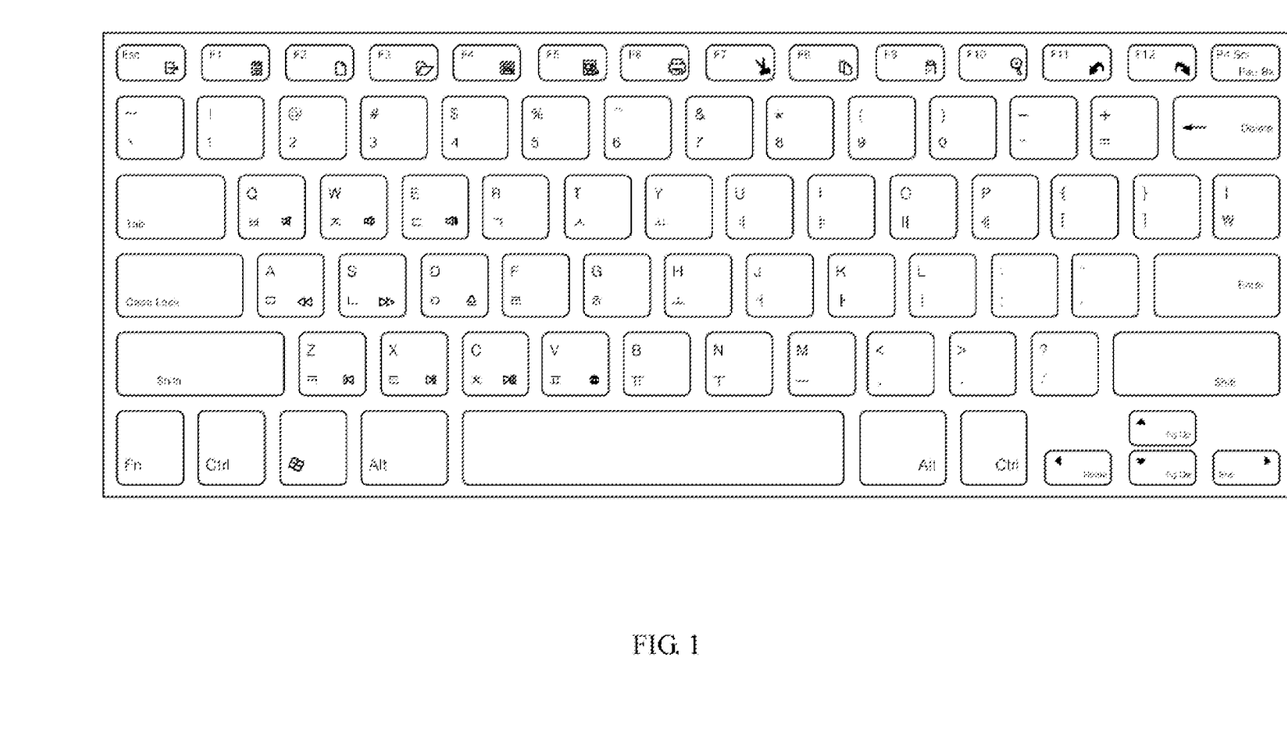
FIG. 1 is a schematic apparent diagram of an LED illuminated keyboard which illuminates with different color hues in accordance with functions according to a preferred embodiment of the present invention.
Figure 2:
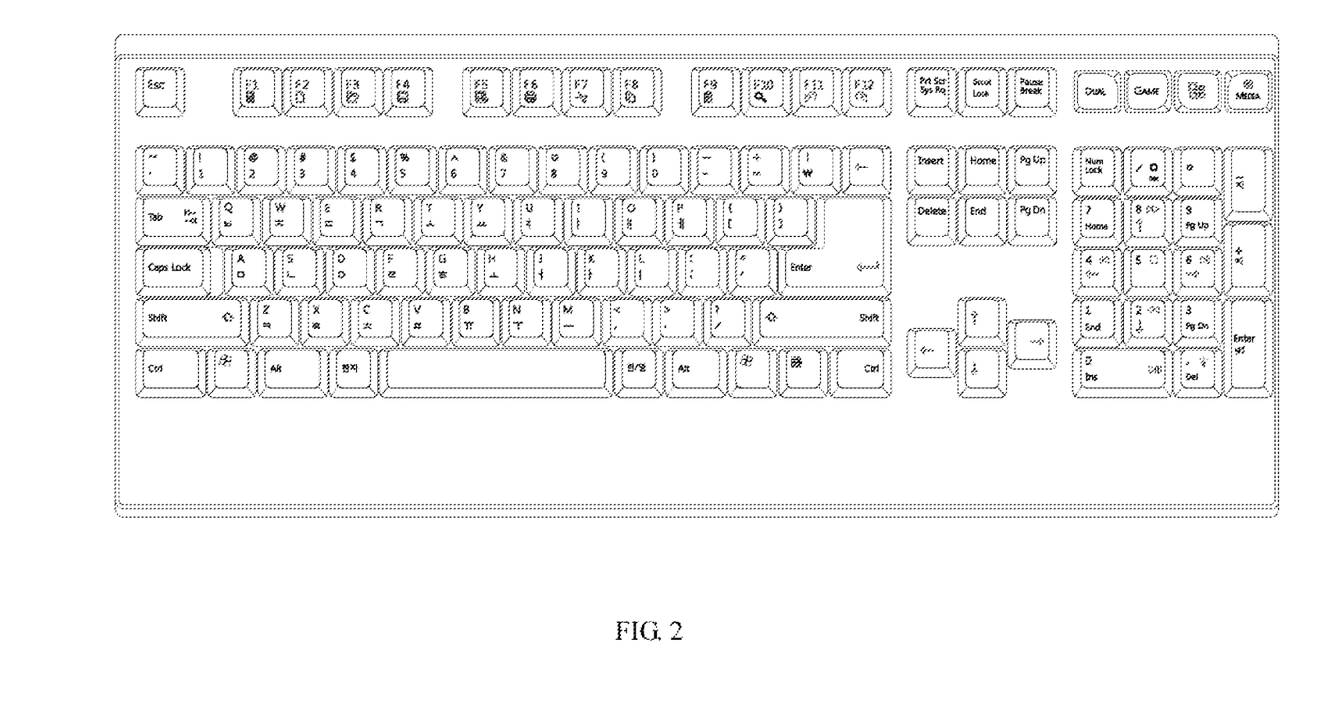
FIG. 2 is another schematic apparent diagram of an LED illuminated keyboard which illuminates with different color hues in accordance with functions according to a preferred embodiment of the present invention.

FIG. 1 and FIG. 2 are two kinds of schematic apparent diagram of an LED illuminated keyboard which illuminates with different color hues in accordance with functions according to a preferred embodiment of the present invention. The multi-hues LED illuminated keyboard according to the present invention includes a plurality of keys having symbols on surfaces thereof. The keyboard as illustrated in FIG. 1 is a Qwerty type wireless mini-keyboard, however, the multi-hues LED illuminated keyboard according to the present invention is not limited to this type of keyboard, any computer used keyboard is applicable, as well as a notebook keyboard or a wired mini-keyboard. The Qwerty type wireless mini-keyboard is convenient for movement and is commonly used recently, and has a key arrangement as illustrated in FIG. 1, which includes 78~82 keys in total. Although only 78 keys are illustrated in FIG. 1, the number of keys can be increased as required. For example, a Korean/English switch key for switching Korean and English and a Korean/Chinese switch key for switching Korean and Chinese can be added, in this case, the total number of keys are 80. Moreover, a location of a function key (Fn key) as illustrated in FIG. 1 can be alternatively designed for easy use.

LED components are respectively disposed beneath the multiple keys for providing light to corresponding keys. The LED components includes LED components with a first color hue, the LED components with the first color hue may be respectively disposed in all or part of the keys. Preferably, the LED components with the first color hue may be disposed in all of the keys. The LED components with the first color hue are categorized, namely, into a first group, a second group and a third group. The categorization means, for example, the LED components with the first color hue are turned on and turned off on a group basis. The LED components may further include LED components with a second color hue, the LED components with the second color hue are respectively disposed in the keys in which the first group of the LED components with the first color hue has already disposed. LED components with other color hues may also be disposed in the keys in which the second group of the LED components with the first color hue are disposed, the other color hues may be at least one of color hues selected from a third color hue, a fourth hue and a fifth color hue. The disposing and wiring of the LED components in each of the keys is known as existing techniques. Description of driving of the LED components applicable to the present invention is provided as follows. The keyboard as illustrated in FIG. 2 is a standard size keyboard with similar color hue group in corresponding to the different operation mode like the mini-keyboard as illustrated in FIG. 1, and the Fn key is replaced by other function keys.

Figure 3:
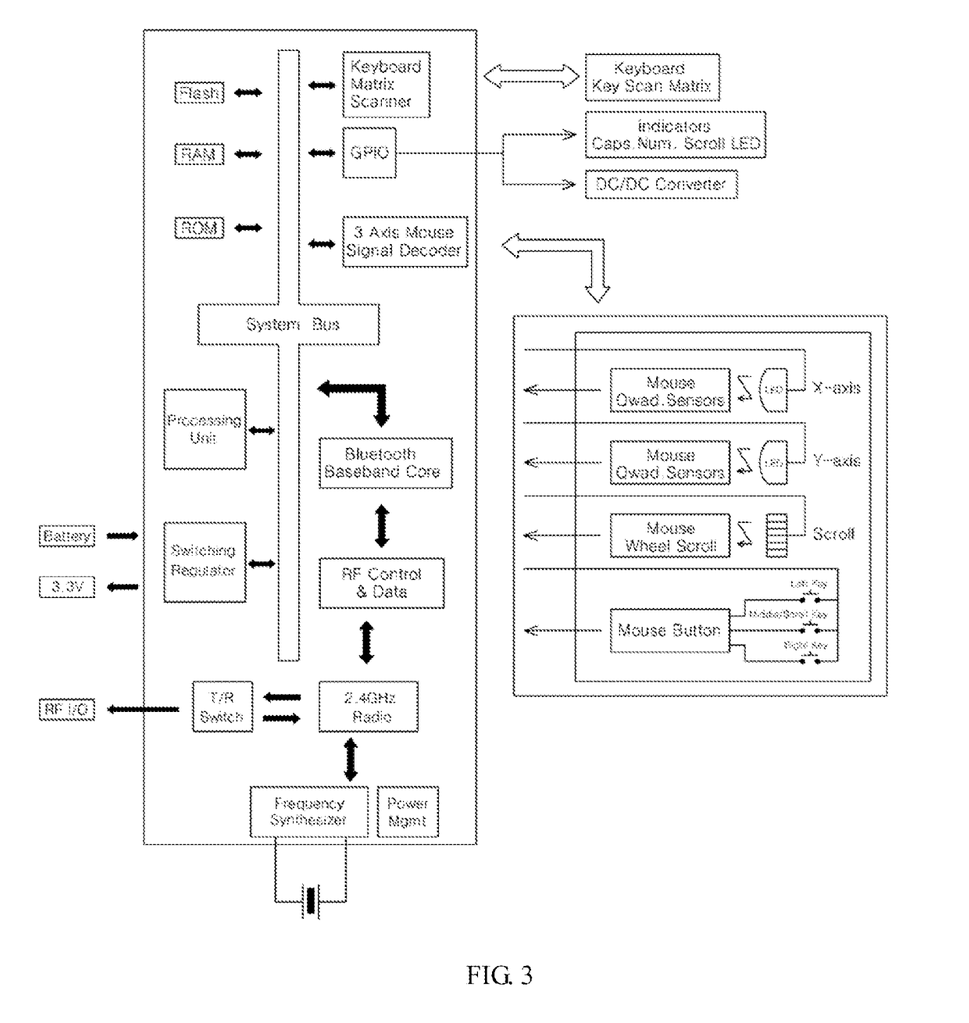
FIG. 3 is a functional diagram of a micro control unit of the LED illuminated keyboard of FIG. 1, which illuminates with different color hues in accordance with different functions.

The keyboard according to the present invention, includes a micro control unit for transmitting signals generated in responsive to pressing of the keys to a computer. The MCU is an MCU normally used in an existing computer-used keyboard. In a preferred embodiment of the keyboard according to the present invention, no other MCU is disposed in the keyboard except for the MCU constituted by a single IC chip. FIG. 3 is a functional diagram of an MCU applicable to a normal keyboard. In the MCU as illustrated in FIG. 3, it should be particularly noted that a GPIO (general purpose input/output) for extending functions of the MCU is provided. The GPIO is used for controlling LED components with specific color dues to illuminate in group by pressing a specific key. Therefore, the present invention can enable the keys in the keyboard to illuminate with different color dues in group by a low cost and a simple solution. In a normal keyboard, the GPIO is generally used for control of indicator lamps. The indicator lamps normally indicate an ON or OFF state of a Cap Lock key, a Num Lock key, a Scroll Lock key, etc.

The LED illuminated keyboard includes a first control signal generating key and a second control signal generating key, the first control signal generating key generates a first control signal, the second control signal generating key generates a second control signal. Preferably, the first control signal generating key is the Caps Lock key, the second control signal generating key is the Fn key. Although the Fn key cannot be found in a normal computer used keyboard, it is frequently used in an existing mini-keyboard.

The keys in which the LED components with the second color hue disposed are the Caps Lock key and 26 alphabet keys; the keys in which the LED components with the at least one color hue selected from the third color hue, the fourth hue and the fifth color hue disposed are the Fn key and function extending keys. The so-called function extending keys are the keys making the computer implement functions different from original functions of the keys when being pressed upon the condition that the Fn key is in an ON state. For example, multi-media function keys for executing functions of a multi-media program when the computer implements the multi-media program, shortcut keys capable of executing a specific procedure in a certain program when the computer implements the program and the function extending keys are pressed, and function enhancing keys having other key values when the function key (Fn key) is in the ON state even if the function enhancing keys have unique values when being combined with a Shift key, a Ctrl key or an Alt key.

As illustrated in FIG. 1, the multi-media function keys are configured at the alphabet keys Q, W, E, A, S, D, Z, X, C, V, etc. In this case, when the multi-media program is implemented, play/stop function of the selected music, video, or the like is executed upon the condition that the alphabet key C is pressed while the Fn key is in the ON state. During the music or video is played, mute function is executed upon the condition that the alphabet key Q is pressed while the Fn key is in the ON state. In the keyboard as illustrated in FIG. 1, these multi-media functions are identified by use of symbols on the corresponding keys. The symbols are regular symbols. The LED components with the third color hue are disposed in the multi-media function keys.

As illustrated in FIG. 1, the shortcut keys are configured at the Esc key, the F1~F12 keys and the PrtScr key. The Esc key has an exiting (Exit) function; the F1 key has a calculator function; the F2 key has a create-new (New) function; the F3 key has a document opening (Open) function; the F4 key has a saving (Save) function; the F5 key has a saving-as (Save As) function; the F6 key has a printing (Print) function; the F7 key has a cutting (Cut) function; the F8 key has a copying (Copy) function; the F9 key has a pasting (Paste) function; the F10 key has a finding (Find) function; the F11 key has a undoing (Undo) function; the F12 key has a redoing (Redo) function; the PrtScr key has a pausing and breaking (Pause Break, Pau_Bk) function. The LED components with the fourth color hue are disposed in the shortcut keys.

As illustrated in FIG. 1, other function extending keys as defined above are configured in the keyboard according to the present invention, such as four direction keys and a Backspace key. The left direction key further has function of a Home key; the right direction key further has function of a End key; the upward direction key further has function of a Pageup key; the downward direction key further has function of a Pagedown key; and the Backspace key further has function of a Delete key. When a program such as Microsoft Word is implemented, the function of the Home key is executed upon the condition that the left direction key is pressed while the Fn key is in the ON state. Since the wireless mini-keyboard is a small-sized keyboard, it is impossible to dispose all the keys thereon, consequently, the configuration of these function extending keys are necessary. Therefore, the function of the Home key, the function of the End key, the function of the Pageup key, the function of the Pagedown key and the function of the Delete key are respectively configured in the four direction keys and the Backspace key, as described above. The LED components with the fifth color hue are disposed in the function enhancing keys.

Although the above configuration of keys can be seen in the normally used mini-keyboard, the normally used mini-keyboard does not include the LED components illumination control as provided in the present invention.

The keyboard according to the present invention includes switch circuits for controlling illumination of the LED components according to output signals of the GPIO of the MCU. The switch circuits are connected to an output terminal of the GPIO. The switch circuits include a first switch circuit, a second switch circuit, a third switch circuit and a fourth switch circuit. The first switch circuit enables the LED components with the second color hue to illuminate when the first control signal generating key (Caps Lock key) is in the ON state. The second switch circuit enables the first group of the LED components with the first color hue to illuminate when the first control signal generating key (Caps Lock key) is in an OFF state. The third switch circuit enables the LED components with at least one color hue selected from the third color hue, the fourth color hue and the fifth color hue to illuminate when the second control signal generating key (Fn key) is in an ON state. The fourth switch circuit enables the second group of the LED components with the first color hue to illuminate when the second control signal generating key (Fn key) is in an OFF state. Embodiments of these switch circuits can be referred to FIGS. 4-7.

Moreover, upon the condition that the keys of the keyboard are pressed to transmit original values thereof to the computer, the MCU controls the third group of the LED components with the first color hue to illuminate.

Details of how to control the LED components with various color hues to illuminate are described below with reference to FIGS. 4-7.

Firstly, if the keyboard according to the present invention is wireless mini-keyboard, the wireless mini-keyboard is connected to the computer host through Bluetooth communication to enter an input ready state when the computer is in an ON state. At this moment, the keyboard provides power supply to the LED components, and accordingly the LED components with the first color hue illuminate. By means of such initialization state, all of the LED components with the first color hue are set to illuminate. Once the power supply is provided, the third group of the LED components with the first color hue illuminate, and the illumination of the third group of the LED components with the first color hue is controlled by a program stored in a ROM of the MCU.

Details of illumination of the first and second groups of the LED components with the first color hue are described below.

Figure 4:
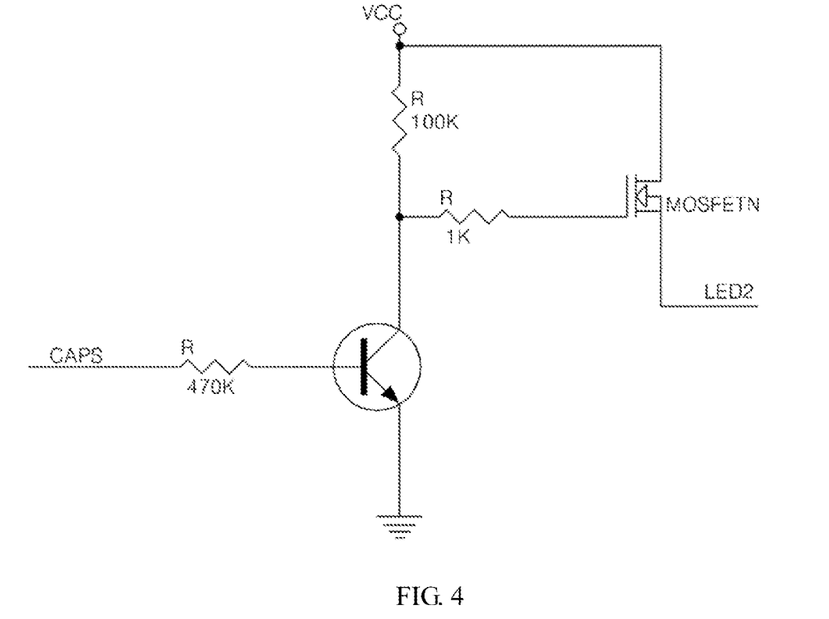
FIG. 4 is a schematic diagram of a first switch circuit which controls illumination of LED components in accordance with a output signals of GPIO of the micro control unit.
Figure 5:
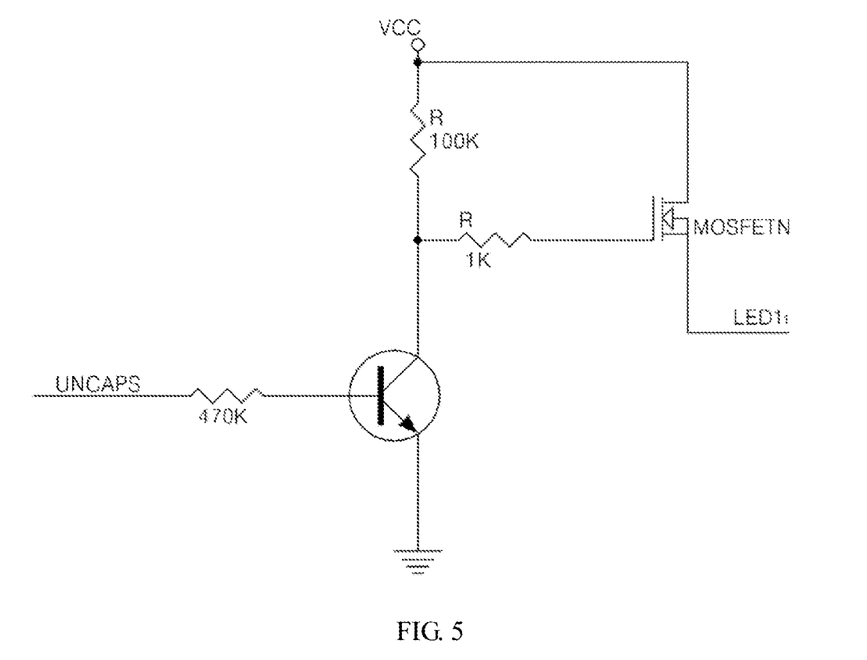
FIG. 5 is a schematic diagram of a second switch circuit which controls the illumination of LED components in accordance with output signals of GPIO of the micro control unit.

In the initialization state, the first control signal generating key (Caps Lock key) is in an OFF state, therefore, it can be known from the circuit as illustrated in FIG. 5 that the first group of the LED components with the first color hue illuminate. Referring to the switch circuit as illustrated in FIG. 5, when the first control signal generating key (Caps Lock key) is in the OFF state, a LOW control signal serving as an UNCAPS signal is input to a transistor, therefore, all the first group of the LED components with the first color hue connecting to the circuit illuminate. In FIG. 5, $LED1_1$ represents the first group of the LED components with the first color hue. Referring also to the switch circuit as illustrated in FIG. 4, because the Caps Lock key is in the OFF state, no CAPS signal is generated, and it is a HIGH control signal to the transistor, therefore, all the LED components with the second hue do not illuminate. In FIG. 4, LED2 represents the LED components with the second color hue.

Figure 6:
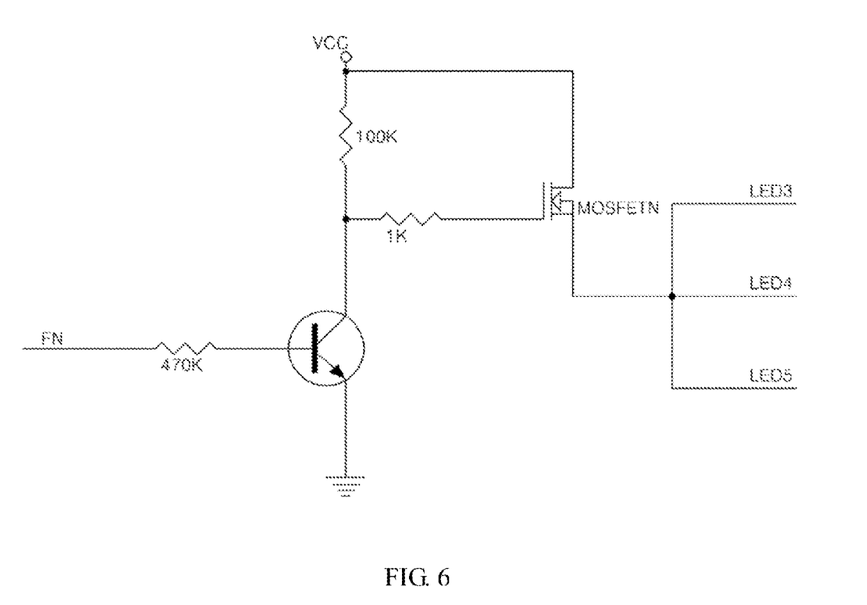
FIG. 6 is a schematic diagram of a third switch circuit which controls the illumination of LED components in accordance with output signals of GPIO of the micro control unit.
Figure 7:
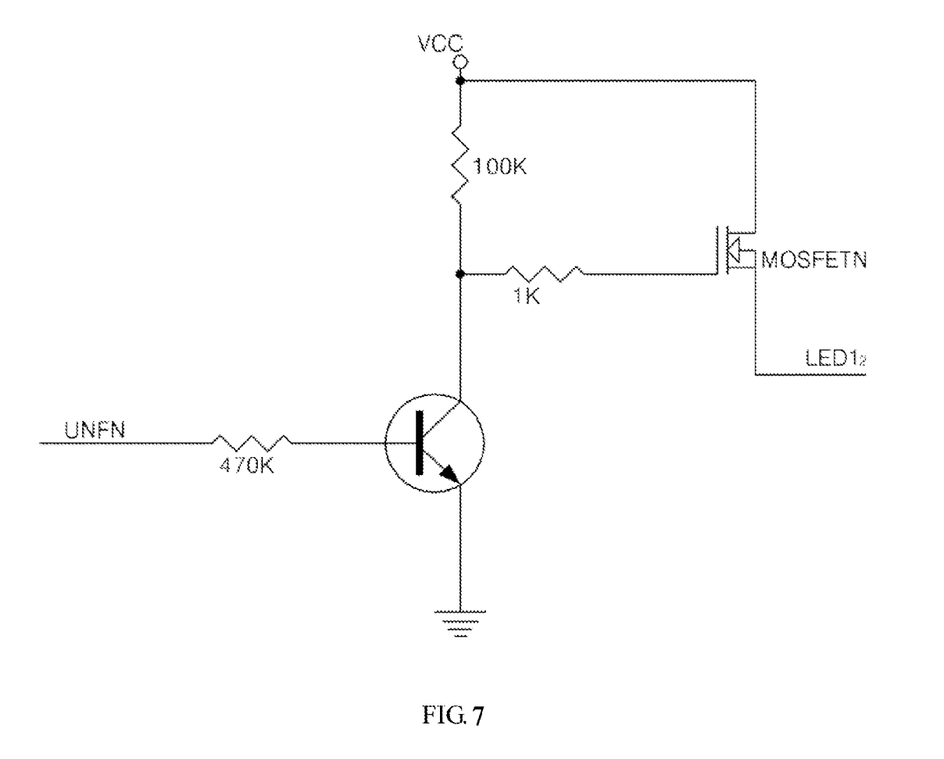
FIG. 7 is a schematic diagram of a fourth switch circuit which controls the illumination of LED components in accordance with output signals of GPIO of the micro control unit.

Moreover, in the initialization state, the second control signal generating key (Fn key) is in an OFF state, therefore, it can be known from the circuit as illustrated in FIG. 7 that the second group of the LED components with the first color hue illuminate. Referring to the switch circuit as illustrated in FIG. 7, when the second control signal generating key (Fn key) is in the OFF state, a LOW control signal serving as an UNFN signal is input to a transistor, therefore, all the second group of the LED components with the first color hue connecting to the circuit illuminate. In FIG. 7, $LED1_2$ represents the second group of the LED components with the first color hue. Referring to the switch circuit as illustrated in FIG. 6, because the second control signal generating key (Fn key) is in the OFF state, no Fn signal is generated and the HIGH control signal is input to the transistor, therefore, all the LED components with the third color hue, the fourth color hue and the fifth color hue, which are connected to the switch circuits, do not illuminate. In FIG. 6, LED3 represents the LED components with the third color hue, LED4 represents the LED components with the fourth color hue, and LED5 represents the LED components with the fifth color hue.

Therefore, when the keyboard according to the present invention is in the initialization state, through controlling the first group of the LED components with the first color hue to illuminate by the switch circuit as illustrated in FIG. 5, and controlling the second group of the LED components with the first color hue to illuminate by the switch circuit as illustrated in FIG. 7, and controlling the third group of the LED components with the first color hue to illuminate by the micro control unit, all the LED components with the first color hue are enabled to illuminate.

Secondly, when it is needed to successively input capital letters, the Caps Lock key is pressed once to make the Caps Lock key in the ON state, in this circumstance, capital letters can be input by pressing the alphabet keys. To identify this type of input state better and to make the input more convenient, the Caps Lock key and the 26 alphabet keys of the keyboard according to the present invention are illuminated with the second color hue. In this case, the Caps Lock key and the 26 alphabet keys of the keyboard according to the present invention are not illuminated with the first color hue, while other keys are illuminated with the first color hue, details are as follows.

When user presses Caps Lock key to make it in the ON state, a CAPS signal (i.e., a LOW control signal) is input to the transistor of the switch circuit in FIG. 4, and thus all the LED components with the second color hue illuminate. At the same time, as the Caps Lock key is in the ON state, no UNCAPS signal is input to the switch circuit in FIG. 5, thus the first group of the LED components with the first color hue are in a non-illumination state; no Fn signal is input to the switch circuit in FIG. 6, thus the first group of the LED components with the third color hue, the fourth color hue and the fifth color hue are in a non-illumination state; An UNFN signal is input to the switch circuit in FIG. 7, thus the second group of the LED components with the first color hue are in an illumination state. Moreover, the power supply provided to the third group of the LED components with the first color hue is maintained, thus the third group of the LED components with the first color hue maintain an illumination state. In this circumstance, the second and third groups of the LED components with the first color hue and the LED components with the second color hue are in the illumination state, while other LED components are in the non-illumination state. Accordingly, because both the Caps Lock key and the 26 alphabet keys illuminate with the second color hue, the Caps Lock key and the 26 alphabet keys can be identified better, and thus the input operation of the Caps Lock key and the 26 alphabet keys is more convenient. Moreover, other keys than the Caps Lock key and the 26 alphabet keys still illuminate with the first color hue, thus the keys can be identified and used easily in a dark circumstance.

The followings describes the illumination of the LED components when the function extending keys are used upon the condition that the Fn key is pressed in the mini-keyboard.

In the keyboard according to the present invention, when the Fn key is pressed, the Fn key is in the ON state; when the Fn key is released, the Fn key is in the OFF state. In can be understood that, as same as the Caps Lock key, the Fn key is in the ON state when the Fn key is pressed once, and when being pressed again, the Fn key is in the OFF state.

The function extending keys used when the Fn key is in the ON state are multi-media function keys, shortcut keys and function enhancing keys (for example, the four direction key and the Backspace key). It is assumed that the LED components with the third color hue are disposed in the multi-media function keys, the LED components with the fourth color hue are disposed in the shortcut keys, and the LED components with the fifth color hue are disposed in the function enhancing keys.

In the keyboard according to the present invention, when the Fn key is pressed while the Caps Lock key is in the ON state, the Caps Lock key switches to the OFF state automatically. In contrary, when the Caps Lock key is pressed while the Fn key is in the ON state, the Fn key switches to the OFF state automatically.

When the Fn key are pressed to make the Fn key is in the ON state, no CAPS signal is input to the switch circuit in FIG. 4, and thus the LED components with the second color hue are in the non-illumination state. UNCAPS signal is input to the switch circuit in FIG. 5, and thus the first group of the LED components with the first color hue are in the illumination state. An Fn signal is input to the switch circuit in FIG. 6, thus all the LED components with the third color hue, the fourth color hue and the fifth color hue are in the illumination state. No UNFN signal is input to the switch circuit in FIG. 7, thus the second group of the LED components with the first color hue are in the non-illumination state. Moreover, the power supply (Vcc) provided to the third group of the LED components with the first color hue is maintained, thus the third group of the LED components with the first color hue maintain the illumination state. Therefore, when the Fn key is in the ON state, the first and third groups of the LED components with the first color hue and the LED components with the third color hue, the fourth color hue and the fifth color hue are all in the illumination state, while other LED components are in the non-illumination state.

Besides, no matter which state the keyboard according to the present invention is in (for example, the Caps Lock key is in the ON or OFF state, or the Fn key is in the ON or OFF state), when no operation is performed on the keyboard within a time period defined by a program of the MCU, the power supply (Vcc) provided to all the LED components can be cut off by the MCU to make all the LED components stop illuminating, so as to save electric energy. When all the LED components do not illuminate, the keyboard according to the present invention is in a standby mode. Under the standby mode, the keyboard can be immediately switched to an input ready mode when any one of the keys of the keyboard is pressed. Preferably, a value corresponding to the key being pressed (the value implementing the function of the key) is not transmitted to the computer when the keyboard is switched from the standby mode to the input ready mode, in this case, the key pressing merely functions as the mode switching. When the keyboard re-enters the input ready mode after all the LED components are turned off for power saving in a certain state (i.e., switching from the standby mode to the input ready mode), the keyboard can recover to the previous illumination state.

As described above, the keyboard according to the present invention can automatically perform non-illumination and illumination switching on the LED components with different color hues simultaneously in accordance with functions, therefore, the keyboard is convenient for use. Moreover, a common used MCU in the keyboard can be used to realize the illumination of multiple kinds of light without the need of an additional MCU, therefore, the keyboard according to the present invention has a low cost and a simple configuration.

It should be noted that the above embodiments are merely provided for describing the technical solutions of the present invention, but not intended to limit the present invention. To persons of ordinary skill in the art, various modifications and changes can be made to the present invention. Any modification, equivalent replacement, and improvement made by persons of ordinary skill in the art without departing from the spirit of the present invention shall fall within the protection scope.

What is claimed is:

1. An LED illuminated keyboard, which illuminates with different color hues in accordance with different functions, the LED illuminated keyboard comprising:
   a plurality of keys, comprising a first control signal generating key for generating a first control signal, a second control signal generating key for generating a second control signal, a plurality of alphabet keys and a plurality of function extending keys;
   a micro control unit (MCU) for transmitting signals generated by the plurality of keys to a computer; and
   a plurality of LED components respectively disposed beneath the plurality of keys to provide light for corresponding keys;
   wherein the LED components comprise a plurality of first LED components, a plurality of second LED components, and a plurality of third LED components, the plurality of first LED components have a first color hue, the plurality of second LED components have a second color hue, and the plurality of third LED components have at least one of a third color hue, a fourth color hue and a fifth color hue;
   wherein each of the plurality of first LED components is respectively disposed in every single key of the LED illuminated keyboard, the plurality of first LED components are categorized into a first group, a second group and a third group; the first group of the plurality of first LED components are disposed in the first control signal generating key and the plurality of alphabet keys respectively, and the plurality of second LED components are also disposed in the first control signal generating key and the plurality of alphabet keys respectively; the second group of the plurality of first LED components are disposed in the second control signal generating key and the plurality of function extending keys respectively, and the plurality of third LED components are also disposed in the second control signal generating key and the plurality of function extending keys respectively; and the third group of the plurality of first LED components are disposed in other keys within the LED illuminated keyboard;
   wherein the LED illuminated keyboard further comprises switch circuits for controlling the illumination of the plurality of LED components according to an output of a general purpose input/output (GPIO) of the MCU; the switch circuits comprises:
   a first switch circuit for controlling a power supply to supply power to the second LED components when the first control signal generating key is in the ON state;
   a second switch circuit for controlling the power supply to provide the power to the first group of the first LED components when the first control signal generating key is in the OFF state;
   a third switch circuit for controlling the power supply to provide the power to the third LED components when the second control signal generating key is in the ON state; and
   a fourth switch circuit for controlling the power supply to provide the power to the second group of the first LED components when the second control signal generating key is in the OFF state;
   wherein the LED illuminated keyboard is a wireless mini-keyboard, when the wireless mini-keyboard is connected to the computer via a Bluetooth communication to enter an input ready state, the power is provided to the plurality of LED components to implement an illumination initialization process; wherein all of the plurality of first LED components are set to illuminate with the first color hue in the illumination initialization process, while the plurality of second LED components and the plurality of third LED components do not illuminate in the illumination initialization process.

2. The LED illuminated keyboard of claim 1, wherein the LED illuminated keyboard enters a standby mode when no operation is performed on the keyboard within a predetermined time period, and the switch circuits cuts off the power voltage to the plurality of LED components to make the plurality of LED components stop illuminating when the keyboard is in the standby mode.

3. The LED illuminated keyboard of claim 2, wherein when any one of the plurality of keys is pressed when the LED illuminated keyboard is in the standby mode, pressing of the key merely functions as mode switching and the LED illuminated keyboard immediately re-enters the input ready mode so that illumination of the plurality of LED components are recovered as the illumination initialization process.

* * * * *